United States Patent
Zheng et al.

(10) Patent No.: US 11,269,763 B2
(45) Date of Patent: Mar. 8, 2022

(54) METHODS, APPARATUSES, DEVICES, AND SYSTEMS FOR TESTING BIOMETRIC RECOGNITION DEVICE

(71) Applicant: ALIPAY (HANGZHOU) INFORMATION TECHNOLOGY CO., LTD., Zhejiang (CN)

(72) Inventors: Jianxu Zheng, Hangzhou (CN); Kai Zhu, Hangzhou (CN); Yi Zhang, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/349,316

(22) Filed: Jun. 16, 2021

(65) Prior Publication Data

US 2022/0012171 A1 Jan. 13, 2022

(30) Foreign Application Priority Data

Jul. 13, 2020 (CN) .......................... 202010670690.7

(51) Int. Cl.
*G06F 11/36* (2006.01)
*G06K 9/00* (2006.01)

(52) U.S. Cl.
CPC ...... *G06F 11/3692* (2013.01); *G06K 9/00013* (2013.01); *G06K 9/00067* (2013.01)

(58) Field of Classification Search
CPC ............ G06F 11/3692; G06K 9/00013; G06K 9/00067
See application file for complete search history.

(56) References Cited

U.S. PATENT DOCUMENTS

| | | | |
|---|---|---|---|
| 10,675,760 B2* | 6/2020 | Whitman | A61B 34/37 |
| 10,733,415 B1* | 8/2020 | Yang | G06K 9/00067 |
| 2012/0219934 A1 | 8/2012 | Nakane et al. | |
| 2018/0012008 A1* | 1/2018 | Withrow | B41J 29/38 |
| 2018/0161982 A1* | 6/2018 | Bugenhagen | G06K 9/00885 |

(Continued)

FOREIGN PATENT DOCUMENTS

| | | |
|---|---|---|
| CN | 109495344 | 3/2019 |
| WO | 2017113762 A1 | 7/2017 |

OTHER PUBLICATIONS

Pooja, R. M. "Improving Iris Recognition Performance by Using Cryptography." 2016. (Year: 2016).*

(Continued)

*Primary Examiner* — Utpal D Shah
(74) *Attorney, Agent, or Firm* — Fish & Richardson P.C.

(57) ABSTRACT

Disclosed herein are methods, systems, and apparatus, including computer programs encoded on computer storage media, for testing performance of a biometric characteristic recognition device. One of the methods includes obtaining a target simulated component for testing performance of the biometric characteristic recognition device from a plurality of simulated components. A mechanical arm is controlled, based on a camera component arranged on the mechanical arm, to input biometric characteristic information of the target simulated component to the biometric characteristic recognition device. A recognition result is obtained from the biometric characteristic recognition device and a performance test result of the biometric characteristic recognition device is determined based on the recognition result.

20 Claims, 4 Drawing Sheets

(56) References Cited

U.S. PATENT DOCUMENTS

2020/0279031 A1\* 9/2020 Jasinski ............. G06K 9/00013
2021/0158011 A1\* 5/2021 Serrentino ......... G06K 9/00087

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Noriega-Atala et al., "Extracting Inter-Sentence Relations for Associating Biological Context with Events in Biomedical Texts," Mar. 2019, 1895-1906.
Wang et al., "Survey on Biometrics Template Protection," Journal of Computer Research and Development, 2020, 57 (5): 1003-1021 (partial English translation).
Extended European Search Report in European Appln No. 21182517.9, dated Dec. 17, 2021, 10 pages.

\* cited by examiner

METHODS, APPARATUSES, DEVICES, AND SYSTEMS FOR TESTING BIOMETRIC RECOGNITION DEVICE

CROSS-REFERENCE TO RELATED APPLICATIONS

This application claims priority to Chinese Patent Application No. 202010670690.7, filed on Jul. 13, 2020, which is hereby incorporated by reference in its entirety.

TECHNICAL FIELD

The present specification relates to the field of computer technologies, and in particular, to methods, apparatuses, devices, and systems for testing a biometric recognition device.

BACKGROUND

With the continuous development of computer technologies, end-user devices provide users with more identity recognition methods, such as fingerprint recognition, facial image recognition, and other biometric recognition methods. How to test the biometric recognition performance of the end-user devices has become a focus of device providers.

At present, the biometric recognition performance of an end-user device can be tested through artificial participation. For example, for end-user devices with fingerprint recognition functions, a testee can input fingerprints to different end-user devices in different environments (such as a normal temperature environment and strong light environment) and determine the biometric recognition performance of each end-user device based on a fingerprint recognition result of each end-user device.

However, for different biometric recognition devices (i.e. end-user devices with biometric recognition functions), because the biometric characteristics of the testee may change (for example, the pattern clarity and the humidity of the biometric characteristics will change), and different environments have different environment impact on the biometric characteristics of the testee, the performance determining accuracy of the biometric recognition devices is poor. In addition, an artificial test method also makes the performance determining efficiency of the biometric recognition device low. Therefore, a performance determining solution for the biometric recognition device with higher determining efficiency and accuracy needs to be provided.

SUMMARY

The embodiments of the present specification aim to provide methods, apparatuses, devices, and systems for testing a biometric recognition device, so as to provide a performance determining solution for the biometric recognition device with higher determining efficiency and accuracy.

To achieve the previously described technical solutions, the embodiments of the present specification are implemented below:

According to a first aspect, embodiments of the present specification provide a method for testing a biometric recognition device. The method includes the following: a target simulated component required for testing the performance of a biometric characteristic recognition device is obtained from simulated components that include biometric characteristics, where the simulated components are constructed based on biometric characteristics of a predetermined body part of a target user; a mechanical arm is controlled, based on a camera component arranged on the mechanical arm in target test environments with the same test parameters, to respectively input biometric characteristic information of the target simulated component to the biometric characteristic recognition device, where the test parameters include a light parameter in the target test environment and a pressing force parameter and a pressing angle parameter of the mechanical arm for the target simulated component; and a recognition result obtained by the biometric characteristic recognition device by recognizing the biometric characteristic information of the target simulated component based on predetermined reference biometric characteristic information is obtained, and a performance test result of the biometric characteristic recognition device is determined based on the recognition result.

According to a second aspect, embodiments of the present specification provide an apparatus for testing a biometric recognition device. The apparatus includes: a selection module, configured to obtain a target simulated component required for testing the performance of a biometric characteristic recognition device from simulated components that include biometric characteristics, where the simulated components are constructed based on biometric characteristics of a predetermined body part of a target user; a first input module, configured to control, based on a camera component arranged on the mechanical arm in target test environments with the same test parameters, a mechanical arm to respectively input biometric characteristic information of the target simulated component to the biometric characteristic recognition device, where the test parameters include a light parameter in the target test environment and a pressing force parameter and a pressing angle parameter of the mechanical arm for the target simulated component; and a first recognition module, configured to obtain a recognition result obtained by the biometric characteristic recognition device by recognizing the biometric characteristic information of the target simulated component based on predetermined reference biometric characteristic information, and determine a performance test result of the biometric characteristic recognition device based on the recognition result.

According to a third aspect, embodiments of the present specification provide a device for testing a biometric recognition device. The device for testing a biometric recognition device includes: a processor; and a memory configured to store computer-executable instructions that, when being executed, cause the processor to: obtain a target simulated component required for testing the performance of a biometric characteristic recognition device from simulated components that include biometric characteristics, the simulated components are constructed based on biometric characteristics of a predetermined body part of a target user; control, based on a camera component arranged on the mechanical arm in target test environments with the same test parameters, a mechanical arm to respectively input biometric characteristic information of the target simulated component to the biometric characteristic recognition device, where the test parameters include a light parameter in the target test environment and a pressing force parameter and a pressing angle parameter of the mechanical arm for the target simulated component; and obtain a recognition result obtained by the biometric characteristic recognition device by recognizing the biometric characteristic information of the target simulated component based on predetermined reference biometric characteristic information, and determine a performance test result of the biometric characteristic recognition device based on the recognition result.

According to a fourth aspect, embodiments of the present specification provide a system for testing a biometric recognition device. The system includes a mechanical arm provided with a camera component, simulated components, and a controller. The controller is configured to obtain a target simulated component required for testing the performance of a biometric characteristic recognition device from simulated components that include biometric characteristics, where the simulated components are constructed based on biometric characteristics of a predetermined body part of a target user; control, based on a camera component arranged on the mechanical arm in target test environments with the same test parameters, a mechanical arm to respectively input biometric characteristic information of the target simulated component to the biometric characteristic recognition device, where the test parameters include a light parameter in the target test environment and a pressing force parameter and a pressing angle parameter of the mechanical arm for the target simulated component; and obtain a recognition result obtained by the biometric characteristic recognition device by recognizing the biometric characteristic information of the target simulated component based on predetermined reference biometric characteristic information, and determine a performance test result of the biometric characteristic recognition device based on the recognition result.

According to a fifth aspect, embodiments of the present specification provide a storage medium. The storage medium is configured to store computer-executable instructions that, when being executed, implement the following processes: obtaining a target simulated component required for testing the performance of a biometric characteristic recognition device from simulated components that include biometric characteristics, where the simulated components are constructed based on biometric characteristics of a predetermined body part of a target user; controlling, based on a camera component arranged on the mechanical arm in target test environments with the same test parameters, a mechanical arm to respectively input biometric characteristic information of the target simulated component to the biometric characteristic recognition device, where the test parameters include a light parameter in the target test environment and a pressing force parameter and a pressing angle parameter of the mechanical arm for the target simulated component; and obtaining a recognition result obtained by the biometric characteristic recognition device by recognizing the biometric characteristic information of the target simulated component based on predetermined reference biometric characteristic information, and determining a performance test result of the biometric characteristic recognition device based on the recognition result.

BRIEF DESCRIPTION OF DRAWINGS

In order to describe the embodiments of the present specification or the technical solutions in the existing technologies more clearly, accompanying drawings required for describing the embodiments or the existing technologies will be briefly introduced below. Clearly, the accompanying drawings in the description below show only some embodiments in the present specification, and a person of ordinary skill in the art may still derive other drawings from these accompanying drawings without creative efforts.

DESCRIPTION OF EMBODIMENTS

The embodiments of the present specification provide methods, apparatuses, devices, and systems for testing a biometric recognition device.

To make a person skilled in the art understand the technical solutions in the present specification better, the following clearly and completely describes the technical solutions in the embodiments of the present specification with reference to the accompanying drawings in the embodiments of the present specification. Clearly, the described embodiments are merely some but not all of the embodiments of the present specification. All other embodiments obtained by persons of ordinary skill in the art based on the embodiments of the present specification without creative efforts shall fall within the protection scope of the present specification.

Embodiment I

Figure 1:
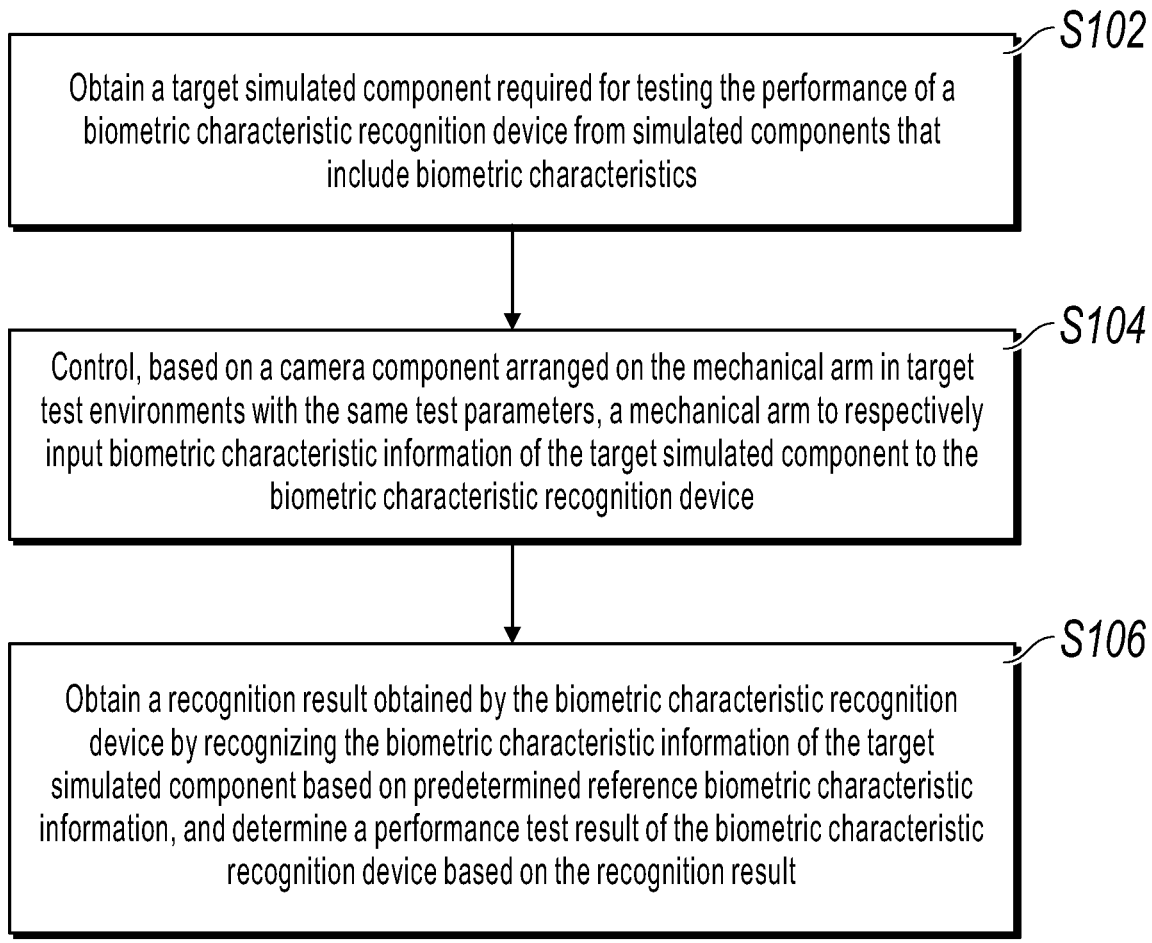
FIG. 1 is a flowchart illustrating an example of a method for testing a biometric recognition device, according to some embodiments of the present specification.

As shown in FIG. 1, embodiments of the present specification provide a method for testing a biometric recognition device. The method can be executed by an end-user device or a server. The end-user device can be a device such as a personal computer, or can be a mobile end-user device such as a mobile phone or a tablet computer. The server can be a stand-alone server, or a server cluster including a plurality of servers. The method can specifically include the following steps.

S102. Obtain a target simulated component required for testing the performance of a biometric characteristic recognition device from simulated components that include biometric characteristics.

The simulated components can be constructed based on biometric characteristics of a predetermined body part of a target user. The predetermined body part can be a part that has biometric characteristics, such as a finger or a palm, of the target user. The biometric characteristic can be recognized by the biometric characteristic recognition device, such as a fingerprint or palmprint. The biometric characteristic recognition device can be configured to collect biometric characteristic information of a user and compare the collected biometric characteristic information of the user with pre-stored biometric characteristic information to determine whether they are the same biometric characteristic information. For example, the predetermined body part of the target user can be a finger, the simulated component can be a simulated finger constructed based on the fingerprint of the finger of the target user, and the biometric characteristic recognition device can be a fingerprint recognition device. The fingerprint recognition device can be an optical fingerprint sensor that obtains a fingerprint image by collecting an optical signal, a capacitive fingerprint sensor that obtains a fingerprint image by collecting a capacitive signal, etc.

In implementation, with the continuous development of computer technologies, end-user devices provide users with more identity recognition methods, such as fingerprint recognition, facial image recognition, and other biometric recognition methods. How to test the biometric recognition performance of the end-user devices has become a focus of device providers.

At present, the biometric recognition performance of an end-user device can be tested through artificial participation. For example, for end-user devices with fingerprint recognition functions, a testee can input fingerprints to different end-user devices in different environments (such as a normal temperature environment and strong light environment) and determine the biometric recognition performance of each end-user device based on a fingerprint recognition result of each end-user device. However, for different biometric recognition devices (i.e. end-user devices with biometric recognition functions), because the biometric characteristics of the testee may change (for example, the pattern clarity and the humidity of the biometric characteristics will change), and different environments have different environment impact on the biometric characteristics of the testee, the performance determining accuracy of the biometric recognition devices is poor. In addition, an artificial test method also makes the performance determining efficiency of the biometric recognition device low. Therefore, a performance determining solution for the biometric recognition device with higher determining efficiency and accuracy needs to be provided. In view of the previous description, the embodiments of the present specification provide a technical solution. For details, references can be made to the following content.

A plurality of simulated components can be encoded, and a recognition code of each simulated component obtained through encoding is placed on the corresponding simulated component; meanwhile, the recognition code of each simulated component can be input to a server, and then the server can obtain a target simulated component from the simulated components based on the recognition codes. For example, a corresponding QR code can be generated based on component information of each simulated component, and is placed on the corresponding simulated component. In addition, the QR code of each simulated component can be input to the server, and the server can determine a QR code of the target simulated component required for testing the performance of the current biometric characteristic recognition device based on the QR code of each simulated component, and select the corresponding target simulated component based on the QR code.

S104. Control, based on a camera component arranged on the mechanical arm in target test environments with the same test parameters, a mechanical arm to respectively input biometric characteristic information of the target simulated component to the biometric characteristic recognition device.

The test parameters include a light parameter in the target test environment and a pressing force parameter and a pressing angle parameter of the mechanical arm for the target simulated component. The camera component arranged on the mechanical arm can obtain image information of the target simulated component and transmit the image information to an image processing system, and the image processing system converts the image information into digital information based on pixel distribution, brightness, color, and other information in the obtained image information. Then, the image processing system calculates the digital information and extracts characteristics of the target simulated component, and then control the mechanical arm to input the biometric characteristic information of the target simulated component to the corresponding biometric characteristic recognition device.

In implementation, there can be a plurality of biometric characteristic recognition devices. The camera component arranged on the mechanical arm can control the mechanical arm to respectively input the biometric characteristic information of the target simulated component to the biometric characteristic recognition devices in order.

Since the target simulated component is input to each biometric characteristic recognition device in target test steps with the same test parameters, the consistency of environment variables during recognition of the target simulated component by the biometric characteristic recognition devices can be ensured, so as to improve the performance test accuracy of the biometric characteristic recognition device, and the accuracy of performance comparison between the plurality of biometric characteristic recognition devices can also be ensured.

S106. Obtain a recognition result obtained by the biometric characteristic recognition device by recognizing the biometric characteristic information of the target simulated component based on predetermined reference biometric characteristic information, and determine a performance test result of the biometric characteristic recognition device based on the recognition result.

The predetermined reference biometric characteristic information can be pre-stored biometric characteristic information of the predetermined body part of the target user, or can be pre-input biometric characteristic information of the simulated component.

In implementation, a false acceptance rate (FAR) and a false rejection rate (FRR) obtained by the biometric characteristic recognition device by recognizing the biometric characteristic information of the target simulated component based on the predetermined reference biometric characteristic information can be obtained, and a corresponding recognition result can be determined. That is, the performance test result of the biometric characteristic recognition device can be obtained, based on the FAR and the FRR.

The biometric characteristic recognition device recognizes that a matching score between the biometric characteristic information of the target simulated component and the predetermined reference biometric characteristic information is greater than a predetermined matching threshold when the biometric characteristic information of the target simulated component is different from the predetermined reference biometric characteristic information during testing of the biometric characteristic recognition device by using a plurality of target simulated components. In this case, the FAR is a ratio of the number of target simulated components with the same biometric characteristic information as the predetermined reference biometric characteristic information to the number of all the target simulated components.

The biometric characteristic recognition device recognizes that a matching score between the biometric characteristic information of the target simulated component and the predetermined reference biometric characteristic information is not greater than a predetermined matching threshold when the biometric characteristic information of the target simulated component is the same as the predetermined reference biometric characteristic information during testing of the biometric characteristic recognition device by using a plurality of target simulated components. In this case, the FRR is a ratio of the number of target simulated components with different biometric characteristic information from the predetermined reference biometric characteristic information to the number of all the target simulated components.

In addition, the plurality of biometric characteristic recognition devices can be further sorted based on an FAR and an FRR of each biometric characteristic recognition device, and a sorting result is regarded as the performance test result of each biometric characteristic recognition device.

The previously described determining method for the performance test result of the biometric characteristic recognition device is an optional and implementable determining method. In practice, there can be many different determining methods based on different actual application scenarios. Embodiments of the present specification set no specific limitations thereto.

Embodiments of the present specification provide the method for testing a biometric recognition device. The target simulated component required for testing the performance of the biometric characteristic recognition device is obtained from the simulated components that include the biometric characteristics, where the simulated components are constructed based on the biometric characteristics of the predetermined body part of the target user; the mechanical arm is controlled, based on the camera component arranged on the mechanical arm in the target test environments with the same test parameters, to respectively input the biometric characteristic information of the target simulated component to the biometric characteristic recognition device, where the test parameters include the light parameter in the target test environment, and the pressing force parameter and the pressing angle parameter of the mechanical arm for the target simulated component; and the recognition result obtained by the biometric characteristic recognition device by recognizing the biometric characteristic information of the target simulated component based on the predetermined reference biometric characteristic information is obtained, and the performance test result of the biometric characteristic recognition device is determined based on the recognition result. As such, the mechanical arm, the camera component arranged on the mechanical arm, and the simulated components replace the artificial participation, so that the performance determining efficiency of the biometric characteristic recognition device can be improved; furthermore, the biometric characteristic recognition device is subjected to the performance test under the target test steps with the same test parameters, so that the performance determining accuracy can be guaranteed, i.e. the performance determining efficiency and accuracy of the biometric characteristic recognition device can be improved.

Embodiment II

Figure 2A:
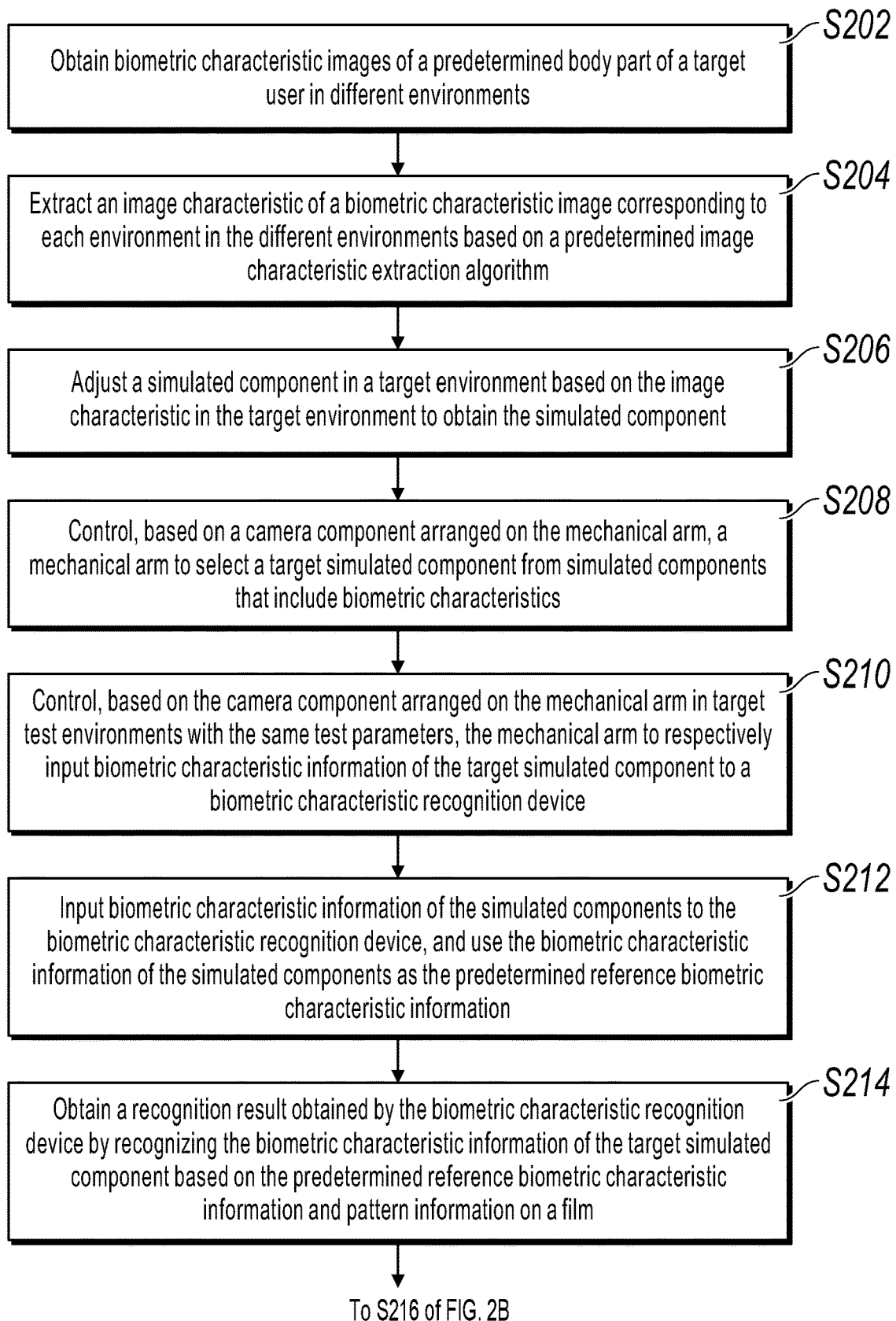
FIGS. 2A-2B is a flowchart illustrating another example of a method for testing a biometric recognition device, according to some embodiments of the present specification.
Figure 2B:
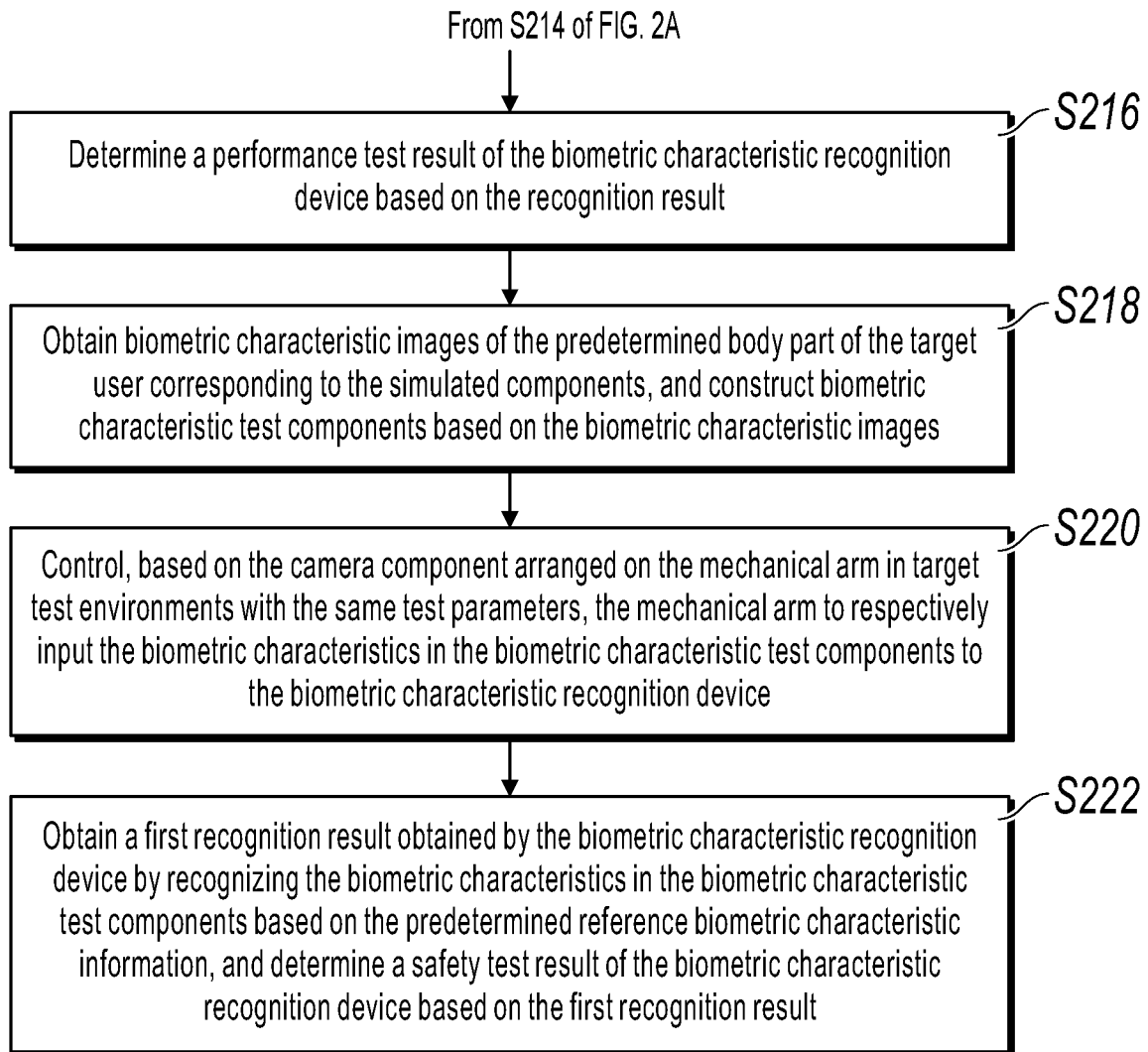

As shown in FIGS. 2A-2B, embodiments of the present specification provide a method for testing a biometric recognition device. The method can be executed by an end-user device or a server. The end-user device can be a device such as a personal computer, or can be a mobile end-user device such as a mobile phone or a tablet computer. The server can be a stand-alone server, or a server cluster including a plurality of servers. The method can specifically include the following steps.

S202. Obtain biometric characteristic images of a predetermined body part of a target user in different environments.

Simulated components can be constructed based on the biometric characteristic images of biometric characteristics of the predetermined body part of the target user in different environments. The different environments correspond to different environment temperatures, environment humidity, light intensity, and humidity of the biometric characteristics of the predetermined body part of the target user. For example, a plurality of different environments can include a normal temperature indoor environment that the humidity of the biometric characteristics of the predetermined body part of the target user is greater than a first humidity threshold and less than a second humidity threshold, a normal temperature indoor environment that the humidity of the biometric characteristics of the predetermined body part of the target user is not greater than the first humidity threshold, a normal temperature indoor environment that the humidity of the biometric characteristics of the predetermined body part of the target user is not less than the second humidity threshold, a strong light environment that the humidity of the biometric characteristics of the predetermined body part of the target user is greater than the first humidity threshold and less than the second humidity threshold, and a cold environment that the humidity of the biometric characteristics of the predetermined body part of the target user is greater than the first humidity threshold and less than the second humidity threshold, etc.

In implementation, the corresponding simulated components can be constructed based on the biometric characteristic images of the predetermined body part of the target user in different environments.

S204. Extract an image characteristic of a biometric characteristic image corresponding to each environment in the different environments based on a predetermined image characteristic extraction algorithm.

The predetermined image characteristic extraction algorithm can be a directional gradient histogram algorithm, a Gaussian function difference algorithm, a local binary pattern algorithm, etc.

In implementation, the biometric characteristic images of the predetermined body part of the target user can have different image characteristics in different environments (for example, in the cold environment that the humidity of the biometric characteristics of the predetermined body part of the target user is greater than the first humidity threshold and less than the second humidity threshold, the obtained biometric characteristic images of the predetermined body part of the target user may include short lines caused by a broken pattern; in the normal temperature indoor environment that the humidity of the biometric characteristics of the predetermined body part of the target user is not less than the second humidity threshold, the obtained biometric characteristic images of the predetermined body part of the target user may contain image noise corresponding to water droplets). Therefore, the biometric characteristic image corresponding to each environment can be subjected to characteristic extraction by using the predetermined image characteristic extraction algorithm to obtain the image characteristic of the biometric characteristic image corresponding to each environment.

In addition, when each environment corresponds to a plurality of biometric characteristic images (i.e. each environment can correspond to a plurality of image characteristics), the image characteristics of the plurality of biometric characteristic images can be processed based on a predetermined machine learning algorithm (such as a clustering algorithm).

S206. Adjust a simulated component in a target environment based on the image characteristic in the target environment to obtain the simulated component.

The target environment can be any one of the different environments.

In implementation, in practice, S206 can be processed in various ways. One optional implementation is provided below. For details, references can be made to the following step I to step III.

Step I. Obtain first environment information containing the simulated component, and a second biometric characteristic image of the predetermined body part of the target user corresponding to the simulated component in an environment corresponding to the first environment information.

Step II. Obtain a first false acceptance rate and a first false rejection rate of the biometric characteristic recognition device for the simulated component, and a second false acceptance rate and a second false rejection rate of the biometric characteristic recognition device for the second biometric characteristic image.

Step III. Obtain the image characteristic in the environment corresponding to the first environment information when a difference between the first false acceptance rate and the second false acceptance rate is not less than a predetermined first threshold and/or a difference between the first false rejection rate and the second false rejection rate is not less than a predetermined second threshold, and adjust the simulated component based on the image characteristic to obtain the simulated component.

In implementation, the simulated component can be adjusted through laser engraving or chemical etching to cause a difference between the biometric characteristic of the simulated component and the biometric characteristic of the predetermined body part of the target user to be less than a predetermined threshold.

S208. Control a mechanical arm to select a target simulated component from simulated components that include biometric characteristics based on a camera component arranged on the mechanical arm.

The biometric characteristics can include one or more of fingerprint characteristics and palmprint characteristics.

S210. Control, based on the camera component arranged on the mechanical arm in target test environments with the same test parameters, the mechanical arm to respectively input biometric characteristic information of the target simulated component to a biometric characteristic recognition device.

For a specific processing process of S210, references can be made to the related content of S104 in previously described embodiment I. Details are omitted here for simplicity.

S212. Input biometric characteristic information of the simulated components to the biometric characteristic recognition device, and use the biometric characteristic information of the simulated components as the predetermined reference biometric characteristic information.

S214. Obtain a recognition result obtained by the biometric characteristic recognition device by recognizing the biometric characteristic information of the target simulated component based on the predetermined reference biometric characteristic information and pattern information on a film.

The film that contains a predetermined pattern can cover the biometric characteristic recognition device. The film that contains the predetermined pattern can contain a predetermined pattern that can be recognized by the biometric characteristic recognition device and have obvious pattern characteristics.

S216. Determine a performance test result of the biometric characteristic recognition device based on the recognition result.

In implementation, assuming that an image recognized by the biometric characteristic recognition device contains the pattern information on the film and the biometric characteristic information of the target simulated component, the image can be matched with the reference biometric characteristic information. If the matching succeeds, it indicates that the recognition accuracy of the biometric characteristic recognition device is low, i.e. the performance of the biometric characteristic recognition device is low.

S218. Obtain biometric characteristic images of the predetermined body part of the target user corresponding to the simulated components, and construct biometric characteristic test components based on the biometric characteristic images.

The biometric characteristic images can be images obtained through processing based on a predetermined image processing method; and the predetermined image processing method includes but is not limited to a mirroring processing method, an inverted color processing method, and a sharpening processing method. The biometric characteristic test components are configured to input the biometric characteristics of the predetermined body part of the target user to the biometric characteristic recognition device. For example, the biometric characteristic test component can be a transparent thin film, silica gel, etc. that includes the biometric characteristic of the predetermined body part of the target user.

In implementation, the biometric characteristic image of the predetermined body part of the target user can be obtained in a non-cooperative mode. For example, an image with the biometric characteristic image of the predetermined body part of the target user can be obtained by scanning text information with the biometric characteristic image of the predetermined body part of the target user. This image is processed by using the predetermined image processing method to obtain the biometric characteristic image of the predetermined body part of the target user. The biometric characteristic test component is constructed based on the obtained biometric characteristic image.

S220. Control, based on the camera component arranged on the mechanical arm in the target test environments with the same test parameters, the mechanical arm to respectively input the biometric characteristics in the biometric characteristic test components to the biometric characteristic recognition device.

In implementation, in practice, S220 can be processed in various ways. One optional implementation is provided below. For details, references can be made to the following step I to step IV.

Step I. Control the mechanical arm to place the biometric characteristic test components on the biometric characteristic recognition device based on the camera component arranged on the mechanical arm, and obtain position information of the biometric characteristic test components on the biometric characteristic recognition device based on the camera component arranged on the mechanical arm.

Step II. Detect whether the biometric characteristic test components are placed on predetermined recognition regions of the recognition device based on the position information.

Step III. Control the mechanical arm to adjust the biometric characteristic test components to the predetermined recognition regions of the biometric characteristic recognition device based on the camera component arranged on the mechanical arm when detecting that the biometric characteristic test components are not placed on the predetermined recognition regions of the recognition device.

Step IV. Control the mechanical arm to press the biometric characteristic test components to input the biometric characteristics in the biometric characteristic test components to the biometric characteristic recognition device.

S222. Obtain a first recognition result obtained by the biometric characteristic recognition device by recognizing the biometric characteristics in the biometric characteristic test components based on the predetermined reference biometric characteristic information, and determine a safety test result of the biometric characteristic recognition device based on the first recognition result.

In implementation, a spoof acceptance rate (SAR) obtained by the biometric characteristic recognition device by recognizing the biometric characteristic image based on the predetermined reference biometric characteristic information can be obtained to determine the first recognition result.

There are biometric characteristic test components actually having different biometric characteristics from the predetermined reference biometric characteristic information during the testing of the biometric characteristic recognition device by using a plurality of biometric characteristic test components, and a matching degree between each of the biometric characteristics in the determined biometric characteristic test components and the predetermined reference biometric characteristic information is greater than a predetermined matching degree threshold when the biometric characteristic recognition device compares the biometric characteristics in the biometric characteristic test component with the predetermined reference biometric characteristic information. In this case, a ratio of the number of the biometric characteristic components to the number of all the biometric characteristic components is the SAR.

Embodiments of the present specification provide the method for testing a biometric recognition device. The target simulated component required for testing the performance of the biometric characteristic recognition device is obtained from the simulated components that include the biometric characteristics, where the simulated components are constructed based on the biometric characteristics of the predetermined body part of the target user; the mechanical arm is controlled, based on the camera component arranged on the mechanical arm in the target test environments with the same test parameters, to respectively input the biometric characteristic information of the target simulated component to the biometric characteristic recognition device, where the test parameters include the light parameter in the target test environment, and the pressing force parameter and the pressing angle parameter of the mechanical arm for the target simulated component; and the recognition result obtained by the biometric characteristic recognition device by recognizing the biometric characteristic information of the target simulated component based on the predetermined reference biometric characteristic information is obtained, and the performance test result of the biometric characteristic recognition device is determined based on the recognition result. As such, the mechanical arm, the camera component arranged on the mechanical arm, and the simulated components replace the artificial participation, so that the performance determining efficiency of the biometric characteristic recognition device can be improved; furthermore, the biometric characteristic recognition device is subjected to the performance test under the target test steps with the same test parameters, so that the performance determining accuracy can be guaranteed, i.e. the performance determining efficiency and accuracy of the biometric characteristic recognition device can be improved.

Embodiment III

The above describes the methods for testing a biometric recognition device of data provided in the embodiments of the present specification. Embodiments of the present specification further provide a system for testing a biometric recognition device.

The system for testing a biometric recognition device includes a mechanical arm provided with a camera component, simulated components, and a controller.

The controller can be configured to obtain a target simulated component required for testing the performance of a biometric characteristic recognition device from simulated components that include biometric characteristics, where the simulated components are constructed based on biometric characteristics of a predetermined body part of a target user; control, based on a camera component arranged on the mechanical arm in target test environments with the same test parameters, a mechanical arm to respectively input biometric characteristic information of the target simulated component to the biometric characteristic recognition device, where the test parameters include a light parameter in the target test environment and a pressing force parameter and a pressing angle parameter of the mechanical arm for the target simulated component; and obtain a recognition result obtained by the biometric characteristic recognition device by recognizing the biometric characteristic information of the target simulated component based on predetermined reference biometric characteristic information, and determine a performance test result of the biometric characteristic recognition device based on the recognition result.

In addition, the controller can be further configured to control the mechanical arm to select the target simulated component from the simulated components that include the biometric characteristics based on the camera component arranged on the mechanical arm.

The controller can be further configured to input biometric characteristic information of the simulated components to the biometric characteristic recognition device, and use the biometric characteristic information of the simulated components as the predetermined reference biometric characteristic information.

The controller can be further configured to obtain biometric characteristic images of the predetermined body part of the target user corresponding to the simulated components, and construct biometric characteristic test components based on the biometric characteristic images, the biometric characteristic test components are configured to input the biometric characteristics of the predetermined body part of the target user to the biometric characteristic recognition device; control, based on the camera component arranged on the mechanical arm in the target test environments with the same test parameters, the mechanical arm to respectively input the biometric characteristics in the biometric characteristic test components to the biometric characteristic recognition device; and obtain a first recognition result obtained by the biometric characteristic recognition device by recognizing the biometric characteristics in the biometric characteristic test components based on the predetermined reference biometric characteristic information, and determine a safety test result of the biometric characteristic recognition device based on the first recognition result.

The controller can be further configured to control the mechanical arm to place the biometric characteristic test components on the biometric characteristic recognition device based on the camera component arranged on the mechanical arm, and obtain position information of the biometric characteristic test components on the biometric characteristic recognition device based on the camera component arranged on the mechanical arm; detect whether the biometric characteristic test components are placed on predetermined recognition regions of the recognition device based on the position information; control the mechanical arm to adjust the biometric characteristic test components to the predetermined recognition regions of the biometric characteristic recognition device based on the camera component arranged on the mechanical arm when detecting that the biometric characteristic test components are not placed on the predetermined recognition regions of the recognition device; and control the mechanical arm to press the biometric characteristic test components to input the biometric characteristics in the biometric characteristic test components to the biometric characteristic recognition device.

The simulated components are constructed based on biometric characteristic images of the biometric characteristics of the predetermined body part of the target user in different environments; the different environments correspond to different environment temperatures, environment humidity, light intensity, and humidity of the biometric characteristics of the predetermined body part of the target user; and the controller can be further configured to obtain the biometric characteristic images of the predetermined body part of the target user in the different environments; extract an image characteristic of a biometric characteristic image corresponding to each environment in the different environments based on a predetermined image characteristic extraction algorithm; and adjust a simulated component in a target environment based on the image characteristic in the target environment to obtain the simulated component, the target environment can be any one of the different environments.

The controller can be further configured to obtain first environment information containing the simulated component, and a second biometric characteristic image of the predetermined body part of the target user corresponding to the simulated component in an environment corresponding to the first environment information; obtain a first false acceptance rate and a first false rejection rate of the biometric characteristic recognition device for the simulated component, and a second false acceptance rate and a second false rejection rate of the biometric characteristic recognition device for the second biometric characteristic image; and obtain the image characteristic in the environment corresponding to the first environment information when a difference between the first false acceptance rate and the second false acceptance rate is not less than a predetermined first threshold, and/or a difference between the first false rejection rate and the second false rejection rate is not less than a predetermined second threshold, and adjust the simulated component based on the image characteristic to obtain the simulated component.

The controller can be further configured to obtain a recognition result obtained by the biometric characteristic recognition device by recognizing the biometric characteristic information of the target simulated component based on the predetermined reference biometric characteristic information and pattern information on a film.

Embodiments of the present specification provide the system for testing a biometric recognition device. The system for testing a biometric recognition device is applied to the method for testing a biometric recognition device. The target simulated component required for testing the performance of the biometric characteristic recognition device is obtained from the simulated components that include the biometric characteristics, the simulated components are constructed based on the biometric characteristics of the predetermined body part of the target user; the mechanical arm is controlled, based on the camera component arranged on the mechanical arm in the target test environments with the same test parameters, to respectively input the biometric characteristic information of the target simulated component to the biometric characteristic recognition device, where the test parameters include the light parameter in the target test environment, and the pressing force parameter and the pressing angle parameter of the mechanical arm for the target simulated component; and the recognition result obtained by the biometric characteristic recognition device by recognizing the biometric characteristic information of the target simulated component based on the predetermined reference biometric characteristic information is obtained, and the performance test result of the biometric characteristic recognition device is determined based on the recognition result. As such, the mechanical arm, the camera component arranged on the mechanical arm, and the simulated components replace the artificial participation, so that the performance determining efficiency of the biometric characteristic recognition device can be improved; furthermore, the biometric characteristic recognition device is subjected to the performance test under the target test steps with the same test parameters, so that the performance determining accuracy can be guaranteed, i.e. the performance determining efficiency and accuracy of the biometric characteristic recognition device can be improved.

Embodiment IV

Figure 3:
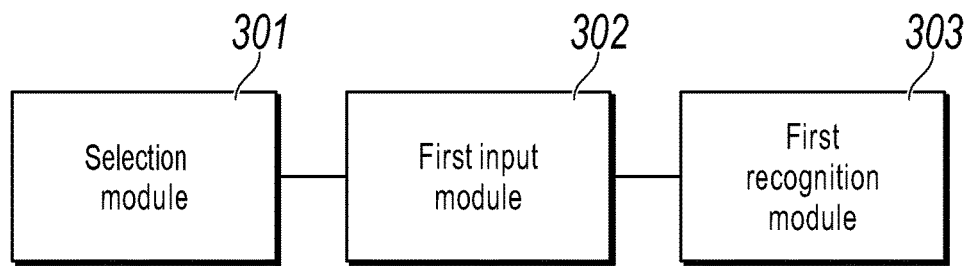
FIG. 3 is a schematic structural diagram illustrating an example of an apparatus for testing a biometric recognition device, according to some embodiments of the present specification.

Embodiments of the present specification further provide an apparatus for testing a biometric recognition device, as shown in FIG. 3.

The apparatus for testing a biometric recognition device includes a selection module 301, a first input module 302 and a first recognition module 303.

The selection module 301 is configured to obtain a target simulated component required for testing the performance of a biometric characteristic recognition device from simulated components that include biometric characteristics, the simulated components are constructed based on biometric characteristics of a predetermined body part of a target user.

The first input module 302 is configured to control, based on a camera component arranged on the mechanical arm in target test environments with the same test parameters, a mechanical arm to respectively input biometric characteristic information of the target simulated component to the biometric characteristic recognition device, where the test parameters include a light parameter in the target test environment and a pressing force parameter and a pressing angle parameter of the mechanical arm for the target simulated component.

The first recognition module 303 is configured to obtain a recognition result obtained by the biometric characteristic recognition device by recognizing the biometric characteristic information of the target simulated component based on predetermined reference biometric characteristic information, and determine a performance test result of the biometric characteristic recognition device based on the recognition result.

In some embodiments of the present specification, the biometric characteristics include one or more of fingerprint characteristics and palmprint characteristics.

In some embodiments of the present specification, the selection module 301 is configured to control the mechanical arm to select the target simulated component from the simulated components that include the biometric characteristics based on the camera component arranged on the mechanical arm.

In some embodiments of the present specification, the apparatus further includes:

a reference setting module, configured to input biometric characteristic information of the simulated components to the biometric characteristic recognition device, and use the biometric characteristic information of the simulated components as the predetermined reference biometric characteristic information.

In some embodiments of the present specification, the apparatus further includes:

a first acquisition module, configured to obtain biometric characteristic images of the predetermined body part of the target user corresponding to the simulated components, and construct biometric characteristic test components based on the biometric characteristic images, the biometric characteristic test components are configured to input the biometric characteristics of the predetermined body part of the target user to the biometric characteristic recognition device;

a second input module, configured to control, based on the camera component arranged on the mechanical arm in the target test environments with the same test parameters, the mechanical arm to respectively input the biometric characteristics in the biometric characteristic test components to the biometric characteristic recognition device; and a second recognition module, configured to obtain a first recognition result obtained by the biometric characteristic recognition device by recognizing the biometric characteristic in the biometric characteristic test components based on the predetermined reference biometric characteristic information, and determine a safety test result of the biometric characteristic recognition device based on the first recognition result.

In some embodiments of the present specification, the biometric characteristic images are images obtained through processing based on a predetermined image processing method; and the predetermined image processing method includes but is not limited to a mirroring processing method, an inverted color processing method, and a sharpening processing method.

In some embodiments of the present specification, the second input module is configured to:

control the mechanical arm to place the biometric characteristic test components on the biometric characteristic recognition device based on the camera component arranged on the mechanical arm, and obtain position information of the biometric characteristic test components on the biometric characteristic recognition device based on the camera component arranged on the mechanical arm;

detect whether the biometric characteristic test components are placed on predetermined recognition regions of the recognition device based on the position information;

control the mechanical arm to adjust the biometric characteristic test components to the predetermined recognition regions of the biometric characteristic recognition device based on the camera component arranged on the mechanical arm when detecting that the biometric characteristic test components are not placed on the predetermined recognition regions of the recognition device; and control the mechanical arm to press the biometric characteristic test components to input the biometric characteristics in the biometric characteristic test components to the biometric characteristic recognition device.

In some embodiments of the present specification, the simulated components are constructed based on biometric characteristic images of the biometric characteristics of the predetermined body part of the target user in different environments; the different environments correspond to different environment temperatures, environment humidity, light intensity, and humidity of the biometric characteristics of the predetermined body part of the target user; and the apparatus further includes:

a second acquisition module, configured to obtain the biometric characteristic images of the predetermined body part of the target user in the different environments;

a characteristic extraction module, configured to extract an image characteristic of a biometric characteristic image corresponding to each environment in the different environments based on a predetermined image characteristic extraction algorithm; and a component adjustment module, configured to adjust a simulated component in a target environment based on the image characteristic in the target environment to obtain the simulated component, the target environment is any one of the different environments.

In some embodiments of the present specification, the component adjustment module is configured to:

obtain first environment information containing the simulated component, and a second biometric characteristic image of the predetermined body part of the target user corresponding to the simulated component in an environment corresponding to the first environment information;

obtain a first false acceptance rate and a first false rejection rate of the biometric characteristic recognition device for the simulated component, and a second false acceptance rate and a second false rejection rate of the biometric characteristic recognition device for the second biometric characteristic image; and obtain the image characteristic in the environment corresponding to the first environment information when a difference between the first false acceptance rate and the second false acceptance rate is not less than a predetermined first threshold, and/or a difference between the first false rejection rate and the second false rejection rate is not less than a predetermined second threshold, and adjust the simulated component based on the image characteristic to obtain the simulated component.

In some embodiments of the present specification, a film that contains a predetermined pattern covers the biometric characteristic recognition device; and the first recognition module 303 is configured to obtain a recognition result obtained by the biometric characteristic recognition device by recognizing the biometric characteristic information of the target simulated component based on the predetermined reference biometric characteristic information and pattern information on the film.

Embodiments of the present specification provide an apparatus for testing a biometric recognition device. The target simulated component required for testing the performance of the biometric characteristic recognition device is obtained from the simulated components that include the biometric characteristics, where the simulated components are constructed based on the biometric characteristics of the predetermined body part of the target user; the mechanical arm is controlled, based on the camera component arranged on the mechanical arm in the target test environments with the same test parameters, to respectively input the biometric characteristic information of the target simulated component to the biometric characteristic recognition device, where the test parameters include the light parameter in the target test environment, and the pressing force parameter and the pressing angle parameter of the mechanical arm for the target simulated component; and the recognition result obtained by the biometric characteristic recognition device by recognizing the biometric characteristic information of the target simulated component based on the predetermined reference biometric characteristic information is obtained, and the performance test result of the biometric characteristic recognition device is determined based on the recognition result. As such, the mechanical arm, the camera component arranged on the mechanical arm, and the simulated components replace the artificial participation, so that the performance determining efficiency of the biometric characteristic recognition device can be improved; furthermore, the biometric characteristic recognition device is subjected to the performance test under the target test steps with the same test parameters, so that the performance determining accuracy can be guaranteed, i.e. the performance determining efficiency and accuracy of the biometric characteristic recognition device can be improved.

Embodiment V

Figure 4:
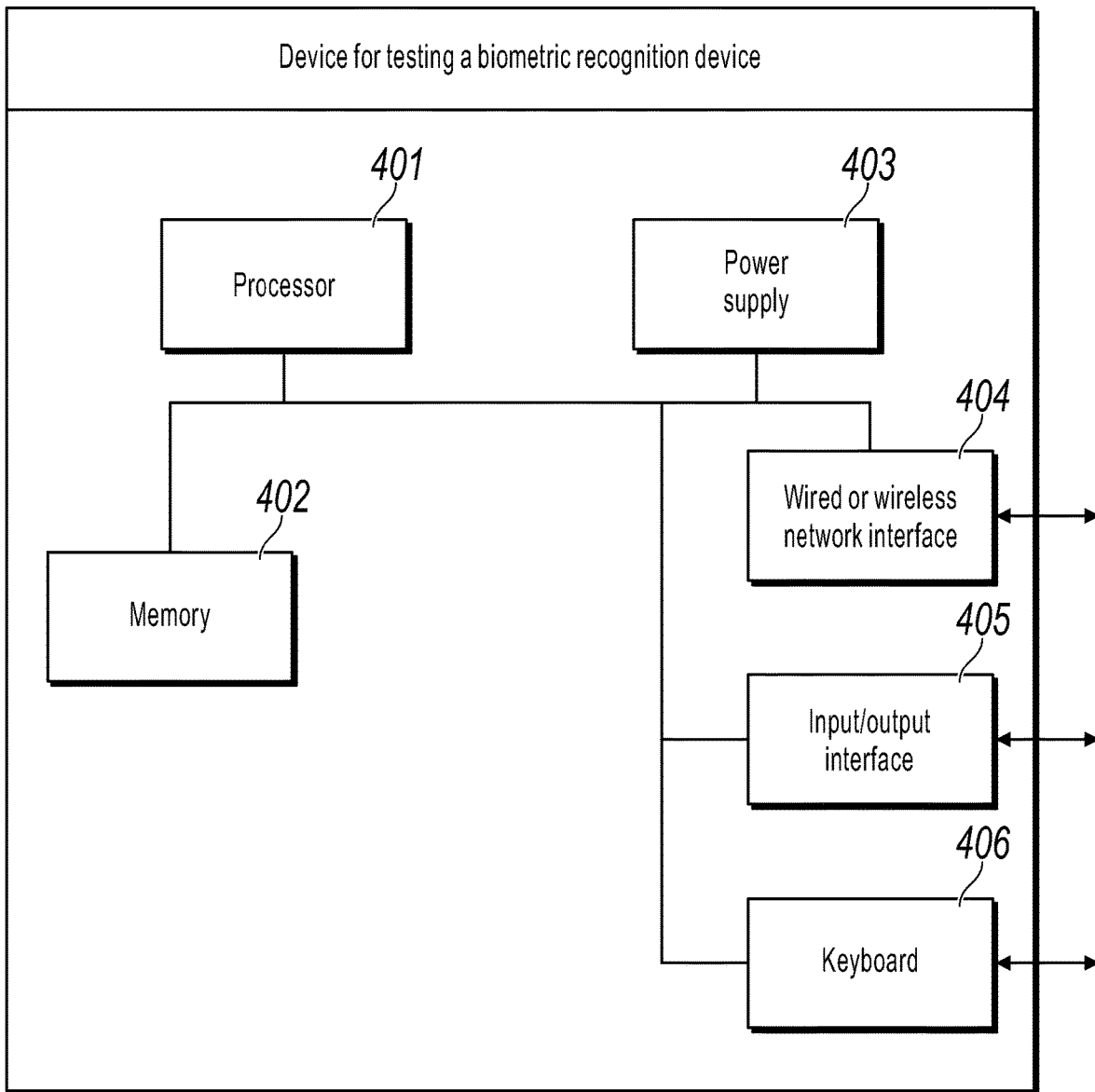
FIG. 4 is a schematic structural diagram illustrating an example of a device for testing a biometric recognition device, according to some embodiments of the present specification.

Embodiments of the present specification further provide a device for testing a biometric recognition device based on the same idea, as shown in FIG. 4.

The device for testing a biometric recognition device can be the end-user device or server provided in the previously described embodiments.

The device for testing a biometric recognition device can greatly vary due to different configurations or performance, and can include one or more processors 401 and memories 402. The memory 402 can store one or more storage applications or data. The memory 402 can be a volatile memory or a non-volatile memory. The applications stored in memory 402 can include one or more modules (not shown in the figure), and each module can include a series of computer-executable instructions in the device for testing a biometric recognition device. Further, the processor 401 can be configured to communicate with the memory 402 and execute the series of computer-executable instructions in the memory 402 in the device for testing a biometric recognition device. The device for testing a biometric recognition device can further include one or more power supplies 403, one or more wired or wireless network interfaces 404, one or more input/output interfaces 405, one or more keyboards 404, etc.

Specifically, in the present embodiment, the device for testing a biometric recognition device includes a memory and one or more programs. The one or more programs are stored in the memory, and the one or more programs can include one or more modules. Each module can include a series of computer-executable instructions in the device for testing a biometric recognition device and one or more processors are configured to execute the one or more programs to execute the following computer-executable instructions:

obtaining a target simulated component required for testing the performance of a biometric characteristic recognition device from simulated components that include biometric characteristics, where the simulated components are constructed based on biometric characteristics of a predetermined body part of a target user;

controlling, based on a camera component arranged on the mechanical arm in target test environments with the same test parameters, a mechanical arm to respectively input biometric characteristic information of the target simulated component to the biometric characteristic recognition device, where the test parameters include a light parameter in the target test environment and a pressing force parameter and a pressing angle parameter of the mechanical arm for the target simulated component; and obtaining a recognition result obtained by the biometric characteristic recognition device by recognizing the biometric characteristic information of the target simulated component based on predetermined reference biometric characteristic information, and determining a performance test result of the biometric characteristic recognition device based on the recognition result.

Optionally, the biometric characteristics include one or more of fingerprint characteristics and palmprint characteristics.

Optionally, the obtaining a target simulated component required for testing the performance of a biometric characteristic recognition device from simulated components that include biometric characteristics includes:

controlling the mechanical arm to select the target simulated component from the simulated components that include the biometric characteristics based on the camera component arranged on the mechanical arm.

Optionally, before the obtaining a recognition result obtained by the biometric characteristic recognition device by recognizing the biometric characteristic information of the target simulated component based on predetermined reference biometric characteristic information, the following instruction is further executed:

inputting biometric characteristic information of the simulated components to the biometric characteristic recognition device, and using the biometric characteristic information of the simulated components as the predetermined reference biometric characteristic information.

Optionally, after the inputting biometric characteristic information of the simulated components to the recognition device, and using the biometric characteristic information of the simulated components as the predetermined reference biometric characteristic information, the following instructions are further executed:

obtaining biometric characteristic images of the predetermined body part of the target user corresponding to the simulated components, and constructing biometric characteristic test components based on the biometric characteristic images, where the biometric characteristic test components are configured to input the biometric characteristics of the predetermined body part of the target user to the biometric characteristic recognition device;

controlling, based on the camera component arranged on the mechanical arm in the target test environments with the same test parameters, the mechanical arm to respectively input the biometric characteristics in the biometric characteristic test components to the biometric characteristic recognition device; and obtaining a first recognition result obtained by the biometric characteristic recognition device by recognizing the biometric characteristics in the biometric characteristic test components based on the predetermined reference biometric characteristic information, and determining a safety test result of the biometric characteristic recognition device based on the first recognition result.

Optionally, the biometric characteristic images are images obtained through processing based on a predetermined image processing method; and the predetermined image processing method includes but is not limited to a mirroring processing method, an inverted color processing method, and a sharpening processing method.

Optionally, the controlling, based on the camera component arranged on the mechanical arm, the mechanical arm to respectively input the biometric characteristics in the biometric characteristic test components to the biometric characteristic recognition device includes:

controlling, based on the camera component arranged on the mechanical arm, the mechanical arm to place the biometric characteristic test components on the biometric characteristic recognition device, and obtaining position information of the biometric characteristic test components on the biometric characteristic recognition device based on the camera component arranged on the mechanical arm;

detecting whether the biometric characteristic test components are placed on predetermined recognition regions of the recognition device based on the position information;

controlling the mechanical arm to adjust the biometric characteristic test components to the predetermined recognition regions of the biometric characteristic recognition device based on the camera component arranged on the mechanical arm when detecting that the biometric characteristic test components are not placed on the predetermined recognition regions of the recognition device; and controlling the mechanical arm to press the biometric characteristic test components to input the biometric characteristics in the biometric characteristic test components to the biometric characteristic recognition device.

Optionally, the simulated components are constructed based on biometric characteristic images of the biometric characteristics of the predetermined body part of the target user in different environments; the different environments correspond to different environment temperatures, environment humidity, light intensity, and humidity of the biometric characteristics of the predetermined body part of the target user; and before the controlling, based on a camera component arranged on the mechanical arm, a mechanical arm to respectively input biometric characteristic information of the target simulated component to the biometric characteristic recognition device, the following instructions are further executed:

obtaining the biometric characteristic images of the predetermined body part of the target user in the different environments;

extracting an image characteristic of a biometric characteristic image corresponding to each environment in the different environments based on a predetermined image characteristic extraction algorithm; and adjusting a simulated component in a target environment based on the image characteristic in the target environment to obtain the simulated component, the target environment is any one of the different environments.

Optionally, the adjusting a simulated component in a target environment based on the image characteristic in the target environment to obtain the simulated component includes:

obtaining first environment information containing the simulated component, and a second biometric characteristic image of the predetermined body part of the target user corresponding to the simulated component in an environment corresponding to the first environment information;

obtaining a first false acceptance rate and a first false rejection rate of the biometric characteristic recognition device for the simulated component, and a second false acceptance rate and a second false rejection rate of the biometric characteristic recognition device for the second biometric characteristic image; and obtaining the image characteristic in the environment corresponding to the first environment information when a difference between the first false acceptance rate and the second false acceptance rate is not less than a predetermined first threshold and/or a difference between the first false rejection rate and the second false rejection rate is not less than a predetermined second threshold, and adjusting the simulated component based on the image characteristic to obtain the simulated component.

Optionally, a film that contains a predetermined pattern covers the biometric characteristic recognition device; and the obtaining a recognition result obtained by the biometric characteristic recognition device by recognizing the biometric characteristic information of the target simulated component based on predetermined reference biometric characteristic information includes:

obtaining a recognition result obtained by the biometric characteristic recognition device by recognizing the biometric characteristic information of the target simulated component based on the predetermined reference biometric characteristic information and pattern information on the film.

Embodiments of the present specification provide the device for testing a biometric recognition device. The target simulated component required for testing the performance of the biometric characteristic recognition device is obtained from the simulated components that include the biometric characteristics, where the simulated components are constructed based on the biometric characteristics of the predetermined body part of the target user; the mechanical arm is controlled, based on the camera component arranged on the mechanical arm in the target test environments with the same test parameters, to respectively input the biometric characteristic information of the target simulated component to the biometric characteristic recognition device, where the test parameters include the light parameter in the target test environment, and the pressing force parameter and the pressing angle parameter of the mechanical arm for the target simulated component; and the recognition result obtained by the biometric characteristic recognition device by recognizing the biometric characteristic information of the target simulated component based on the predetermined reference biometric characteristic information is obtained, and the performance test result of the biometric characteristic recognition device is determined based on the recognition result. As such, the mechanical arm, the camera component arranged on the mechanical arm, and the simulated components replace the artificial participation, so that the performance determining efficiency of the biometric characteristic recognition device can be improved; furthermore, the biometric characteristic recognition device is subjected to the performance test under the target test steps with the same test parameters, so that the performance determining accuracy can be guaranteed, i.e. the performance determining efficiency and accuracy of the biometric characteristic recognition device can be improved.

Embodiment VI

Embodiments of the present specification further provide a computer-readable storage medium. The computer-readable storage medium stores computer programs that, when being executed by a processor, implement all the processes of the previously described embodiments of the methods for testing a biometric recognition device, and can achieve the same technical effects. Details are omitted here for simplicity. The computer-readable storage medium is, for example, a read-only memory (ROM), a random access memory (RAM), a magnetic disk, or an optical disk.

The storage medium is configured to store computer-executable instructions that, when being executed, implement the following processes:

obtaining a target simulated component required for testing the performance of a biometric characteristic recognition device from simulated components that include biometric characteristics, where the simulated components are constructed based on biometric characteristics of a predetermined body part of a target user;

controlling, based on a camera component arranged on the mechanical arm in target test environments with the same test parameters, a mechanical arm to respectively input biometric characteristic information of the target simulated component to the biometric characteristic recognition device, where the test parameters include a light parameter in the target test environment and a pressing force parameter and a pressing angle parameter of the mechanical arm for the target simulated component; and obtaining a recognition result obtained by the biometric characteristic recognition device by recognizing the biometric characteristic information of the target simulated component based on predetermined reference biometric characteristic information, and determining a performance test result of the biometric characteristic recognition device based on the recognition result.

Optionally, the biometric characteristics include one or more of fingerprint characteristics and palmprint characteristics.

Optionally, the obtaining a target simulated component required for testing the performance of a biometric characteristic recognition device from simulated components that include biometric characteristics includes:

controlling the mechanical arm to select the target simulated component from the simulated components that include the biometric characteristics based on the camera component arranged on the mechanical arm.

Optionally, before the obtaining a recognition result obtained by the biometric characteristic recognition device by recognizing the biometric characteristic information of the target simulated component based on predetermined reference biometric characteristic information, the following process is further implemented:

inputting biometric characteristic information of the simulated components to the biometric characteristic recognition device, and using the biometric characteristic information of the simulated components as the predetermined reference biometric characteristic information.

Optionally, after the inputting biometric characteristic information of the simulated components to the recognition device, and using the biometric characteristic information of the simulated components as the predetermined reference biometric characteristic information, the following processes are further implemented:

obtaining biometric characteristic images of the predetermined body part of the target user corresponding to the simulated components, and constructing biometric characteristic test components based on the biometric characteristic images, where the biometric characteristic test components are configured to input the biometric characteristics of the predetermined body part of the target user to the biometric characteristic recognition device;

controlling, based on the camera component arranged on the mechanical arm in the target test environments with the same test parameters, the mechanical arm to respectively input the biometric characteristics in the biometric characteristic test components to the biometric characteristic recognition device; and obtaining a first recognition result obtained by the biometric characteristic recognition device by recognizing the biometric characteristics in the biometric characteristic test components based on the predetermined reference biometric characteristic information, and determining a safety test result of the biometric characteristic recognition device based on the first recognition result.

Optionally, the biometric characteristic images are images obtained through processing based on a predetermined image processing method; and the predetermined image processing method includes but is not limited to a mirroring processing method, an inverted color processing method, and a sharpening processing method.

Optionally, the controlling, based on the camera component arranged on the mechanical arm, the mechanical arm to respectively input the biometric characteristics in the biometric characteristic test components to the biometric characteristic recognition device includes:

controlling the mechanical arm to place the biometric characteristic test components on the biometric characteristic recognition device based on the camera component arranged on the mechanical arm, and obtaining position information of the biometric characteristic test components on the biometric characteristic recognition device based on the camera component arranged on the mechanical arm;

detecting whether the biometric characteristic test components are placed on predetermined recognition regions of the recognition device based on the position information;

controlling the mechanical arm to adjust the biometric characteristic test components to the predetermined recognition regions of the biometric characteristic recognition device based on the camera component arranged on the mechanical arm when detecting that the biometric characteristic test components are not placed on the predetermined recognition regions of the recognition device; and controlling the mechanical arm to press the biometric characteristic test components to input the biometric characteristics in the biometric characteristic test components to the biometric characteristic recognition device.

Optionally, the simulated components are constructed based on biometric characteristic images of the biometric characteristics of the predetermined body part of the target user in different environments; the different environments correspond to different environment temperatures, environment humidity, light intensity, and humidity of the biometric characteristics of the predetermined body part of the target user; and before the controlling, based on a camera component arranged on the mechanical arm, a mechanical arm to respectively input biometric characteristic information of the target simulated component to the biometric characteristic recognition device, the following procedures are further implemented:

obtaining the biometric characteristic images of the predetermined body part of the target user in the different environments;

extracting an image characteristic of a biometric characteristic image corresponding to each environment in the different environments based on a predetermined image characteristic extraction algorithm; and adjusting a simulated component in a target environment based on the image characteristic in the target environment to obtain the simulated component, the target environment is any one of the different environments.

Optionally, the adjusting a simulated component in a target environment based on the image characteristic in the target environment to obtain the simulated component includes:

obtaining first environment information containing the simulated component, and a second biometric characteristic image of the predetermined body part of the target user corresponding to the simulated component in an environment corresponding to the first environment information;

obtaining a first false acceptance rate and a first false rejection rate of the biometric characteristic recognition device for the simulated component, and a second false acceptance rate and a second false rejection rate of the biometric characteristic recognition device for the second biometric characteristic image; and obtaining the image characteristic in the environment corresponding to the first environment information when a difference between the first false acceptance rate and the second false acceptance rate is not less than a predetermined first threshold and/or a difference between the first false rejection rate and the second false rejection rate is not less than a predetermined second threshold, and adjusting the simulated component based on the image characteristic to obtain the simulated component.

Optionally, a film that contains a predetermined pattern covers the biometric characteristic recognition device; and the obtaining a recognition result obtained by the biometric characteristic recognition device by recognizing the biometric characteristic information of the target simulated component based on predetermined reference biometric characteristic information includes:

obtaining a recognition result obtained by the biometric characteristic recognition device by recognizing the biometric characteristic information of the target simulated component based on the predetermined reference biometric characteristic information and pattern information on the film.

Embodiments of the present specification provide the computer-readable storage medium. The target simulated component required for testing the performance of the biometric characteristic recognition device is obtained from the simulated components that include the biometric characteristics, where the simulated components are constructed based on the biometric characteristics of the predetermined body part of the target user; the mechanical arm is controlled, based on the camera component arranged on the mechanical arm in the target test environments with the same test parameters, to respectively input the biometric characteristic information of the target simulated component to the biometric characteristic recognition device, where the test parameters include the light parameter in the target test environment, and the pressing force parameter and the pressing angle parameter of the mechanical arm for the target simulated component; and the recognition result obtained by the biometric characteristic recognition device by recognizing the biometric characteristic information of the target simulated component based on the predetermined reference biometric characteristic information is obtained, and the performance test result of the biometric characteristic recognition device is determined based on the recognition result. As such, the mechanical arm, the camera component arranged on the mechanical arm, and the simulated components replace the artificial participation, so that the performance determining efficiency of the biometric characteristic recognition device can be improved; furthermore, the biometric characteristic recognition device is subjected to the performance test under the target test steps with the same test parameters, so that the performance determining accuracy can be guaranteed, i.e. the performance determining efficiency and accuracy of the biometric characteristic recognition device can be improved.

The foregoing describes the specific embodiments of the present specification. Other embodiments fall within the scope of the appended claims. In some cases, the actions or steps described in the claims can be performed in a different order from that in the embodiments and still achieve desired results. In addition, the processes depicted in the accompanying drawings can achieve the desired results without necessarily requiring the shown specific order or sequence. In some implementations, multitasking and parallel processing are also possible or may be advantageous.

In the 1990s, the improvement on a technology can be clearly distinguished between hardware improvements (for example, improvements on circuit structures such as diodes, transistors and switches) or software improvements (improvements on method processes). However, as technologies develop, current improvements to many method processes can be considered as direct improvements to hardware circuit structures. Almost all designers program an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function of the PLD is determined by a user through device programming. A designer "integrates" a digital system to a single PLD through self-programming, without requiring a chip manufacturer to design and manufacture a dedicated integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. A person skilled in the art should also understand that a hardware circuit that implements a logical method process can be readily obtained provided that the method process is logically programmed by using several of the previously described hardware description languages and is programmed into an integrated circuit.

A controller can be implemented in any appropriate way. For example, the controller can be in a form of a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microcontrollers: ARC 425D, Atmel AT91SAM, Microchip PIC13F24K20, and Silicone Labs C3051F320. A memory controller can be further implemented as a part of control logic of a memory. A person skilled in the art also knows that, in addition to implementing the controller by using the computer-readable program code, method steps can be logically programmed to enable the controller to implement the same function in forms of a logic gate, a switch, an application-specific integrated circuit, a programmable logic controller, and a built-in microcontroller. Therefore, such a controller can be considered as a hardware component, and an apparatus that is included in the controller and configured to implement various functions can also be considered as a structure in the hardware component. Alternatively, the apparatus configured to implement various functions can even be considered as both a software module implementing a method and a structure in the hardware component.

The system, apparatus, module, or unit illustrated in the above embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previously described apparatus is divided to various units based on functions for description when the previous apparatus is described. Certainly, when the one or more embodiments of the present specification are implemented, functions of the units can be implemented in one or more pieces of software and/or hardware.

A person skilled in the art should understand that the embodiments of the present specification can be provided as a method, a system, or a computer program product. Therefore, the one or more embodiments of the present specification can be in a form of hardware only embodiments, software only embodiments, or embodiments with a combination of software and hardware. In addition, the one or more embodiments of the present specification can be in a form of a computer program product that is implemented on one or more computer-usable storage media (including but not limited to a magnetic disk memory, a CD-ROM, an optical memory, etc.) that include computer-usable program code.

The embodiments of the present specification are described with reference to the flowcharts and/or block diagrams of the method, the device (system), and the computer program product according to the embodiments of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

Alternatively, these computer program instructions can be stored in a computer-readable memory that can instruct the computer or the another programmable data processing device to work in a specific way, so that the instructions stored in the computer-readable memory generate an artifact that includes an instruction apparatus. The instruction apparatus implements a specified function in one or more processes in the flowcharts and/or in one or more blocks in the block diagrams.

Alternatively, these computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

In a typical configuration, a computing device includes one or more processors (CPUs), input/output interfaces, network interfaces, and memories.

The memory may include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be computer-readable instructions, data structures, program modules, or other data. Examples of the computer storage medium include but are not limited to a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be configured to store information accessible to a computing device. As described in the present specification, the computer-readable medium does not include computer-readable transitory media such as a modulated data signal and a carrier.

It is worthwhile to note that the terms "comprise", "include", or any other variation thereof are intended to cover a non-exclusive inclusion, so that a process, a method, an article, or a device that includes a list of elements includes those elements and further includes other elements not expressly listed or inherent to such a process, method, article, or device. Without more constraints, an element preceded by "includes a . . . " does not preclude the existence of additional identical elements in the process, method, product, or device that includes the element.

A person skilled in the art should understand that the embodiments of the present specification can be provided as a method, a system, or a computer program product. Therefore, the one or more embodiments of the present specification can be in a form of hardware only embodiments, software only embodiments, or embodiments with a combination of software and hardware. In addition, the one or more embodiments of the present specification can be in a form of a computer program product that is implemented on one or more computer-usable storage media (including but not limited to a magnetic disk memory, a CD-ROM, an optical memory, etc.) that include computer-usable program code.

The one or more embodiments of the present specification can be described in the general context of a computer executable instruction executed by a computer, for example, a program module. Generally, the program module includes a routine, a program, an object, a component, a data structure, etc. executing a specific task or implementing a specific abstract data type. The one or more embodiments of the present specification can also be practiced in distributed computing environments. In the distributed computing environments, tasks are performed by remote processing devices connected through a communications network. In a distributed computing environment, the program module can be located in both local and remote computer storage media including storage devices.

The embodiments in the present specification are described in a progressive way. For same or similar parts of the embodiments, mutual references can be made to the implementations. Each embodiment focuses on a difference from other embodiments. Especially, a system embodiment is basically similar to a method embodiment, and therefore is described briefly. For a related part, references can be made to some descriptions in the method embodiment.

The previous descriptions are merely embodiments of the present specification, and are not intended to limit the present specification. A person skilled in the art can make various modifications and changes to the present specification. Any modification, equivalent replacement, improvement, etc. made without departing from the spirit and principle of the present specification shall fall within the scope of the claims of the present specification.

What is claimed is:

1. A computer-implemented method, comprising:
   obtaining a target simulated component for testing performance of a biometric characteristic recognition device from a plurality of simulated components having one or more biometric characteristics, wherein the plurality of simulated components are constructed based on the one or more biometric characteristics of a predetermined body part of a target user;
   controlling, based on a camera component arranged on a mechanical arm and in a target test environment having one or more test parameters, the mechanical arm to input biometric characteristic information of the target simulated component to the biometric characteristic recognition device;
   obtaining a recognition result from the biometric characteristic recognition device, the recognition result being generated by detecting the biometric characteristic information of the target simulated component based on predetermined reference biometric characteristic information; and
   determining a performance test result of the biometric characteristic recognition device based on the recognition result.

2. The computer-implemented method of claim 1, wherein the one or more test parameters comprise at least one of the following: a light parameter in the target test environment, a pressing force parameter of the mechanical arm for the target simulated component, or a pressing angle parameter of the mechanical arm for the target simulated component.

3. The computer-implemented method of claim 1, wherein the one or more biometric characteristics comprise one or more of fingerprint characteristics and palmprint characteristics.

4. The computer-implemented method of claim 3, wherein obtaining the target simulated component for testing the performance of the biometric characteristic recognition device from the plurality of simulated components having the one or more biometric characteristics comprises:
   controlling, based on the camera component, the mechanical arm to select the target simulated component from the plurality of simulated components.

5. The computer-implemented method of claim 1, wherein before obtaining the recognition result from the biometric characteristic recognition device, the computer-implemented method further comprises:
   inputting biometric characteristic information of the plurality of simulated components to the biometric characteristic recognition device; and
   using the biometric characteristic information of the plurality of simulated components as the predetermined reference biometric characteristic information.

6. The computer-implemented method of claim 5, further comprising:
   obtaining biometric characteristic images of the predetermined body part of the target user;
   constructing biometric characteristic test components based on the biometric characteristic images, wherein the biometric characteristic test components are configured to input the one or more biometric characteristics of the predetermined body part of the target user to the biometric characteristic recognition device;
   controlling, based on the camera component and in the target test environment, the mechanical arm to input the one or more biometric characteristics of the predetermined body part of the target user from the biometric characteristic test components to the biometric characteristic recognition device;
   obtaining a first recognition result from the biometric characteristic recognition device, the first recognition result being generated by detecting the one or more biometric characteristics in the biometric characteristic test components based on the predetermined reference biometric characteristic information; and
   determining a safety test result of the biometric characteristic recognition device based on the first recognition result.

7. The computer-implemented method of claim 6, wherein controlling, based on the camera component and in the target test environment, the mechanical arm to input the one or more biometric characteristics of the predetermined body part of the target user from the biometric characteristic test components to the biometric characteristic recognition device comprises:
   controlling the mechanical arm to place the biometric characteristic test components on the biometric characteristic recognition device based on the camera component;
   obtaining position information of the biometric characteristic test components on the biometric characteristic recognition device based on the camera component;
   detecting whether the biometric characteristic test components are placed on predetermined recognition regions of the biometric characteristics recognition device based on the position information;
   when detecting that the biometric characteristic test components are not placed on the predetermined recognition regions of the biometric characteristics recognition device, controlling the mechanical arm to move the biometric characteristic test components to the predetermined recognition regions of the biometric characteristic recognition device based on the camera component; and
   controlling the mechanical arm to operate the biometric characteristic test components to input the one or more biometric characteristics of the predetermined body part of the target user from the biometric characteristic test components to the biometric characteristic recognition device.

8. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
  obtaining a target simulated component for testing performance of a biometric characteristic recognition device from a plurality of simulated components having one or more biometric characteristics, wherein the plurality of simulated components are constructed based on the one or more biometric characteristics of a predetermined body part of a target user;
  controlling, based on a camera component arranged on a mechanical arm and in a target test environment having one or more test parameters, the mechanical arm to input biometric characteristic information of the target simulated component to the biometric characteristic recognition device;
  obtaining a recognition result from the biometric characteristic recognition device, the recognition result being generated by detecting the biometric characteristic information of the target simulated component based on predetermined reference biometric characteristic information; and
  determining a performance test result of the biometric characteristic recognition device based on the recognition result.

9. The computer-implemented system of claim 8, wherein the one or more test parameters comprise at least one of the following: a light parameter in the target test environment, a pressing force parameter of the mechanical arm for the target simulated component, or a pressing angle parameter of the mechanical arm for the target simulated component.

10. The computer-implemented system of claim 8, wherein the one or more biometric characteristics comprise one or more of fingerprint characteristics and palmprint characteristics.

11. The computer-implemented system of claim 10, wherein obtaining the target simulated component for testing the performance of the biometric characteristic recognition device from the plurality of simulated components having the one or more biometric characteristics comprises:
  controlling, based on the camera component, the mechanical arm to select the target simulated component from the plurality of simulated components.

12. The computer-implemented system of claim 8, wherein before obtaining the recognition result from the biometric characteristic recognition device, the one or more operations further comprise:
  inputting biometric characteristic information of the plurality of simulated components to the biometric characteristic recognition device; and
  using the biometric characteristic information of the plurality of simulated components as the predetermined reference biometric characteristic information.

13. The computer-implemented system of claim 12, wherein the one or more operations further comprise:
  obtaining biometric characteristic images of the predetermined body part of the target user;
  constructing biometric characteristic test components based on the biometric characteristic images, wherein the biometric characteristic test components are configured to input the one or more biometric characteristics of the predetermined body part of the target user to the biometric characteristic recognition device;
  controlling, based on the camera component and in the target test environment, the mechanical arm to input the one or more biometric characteristics of the predetermined body part of the target user from the biometric characteristic test components to the biometric characteristic recognition device;
  obtaining a first recognition result from the biometric characteristic recognition device, the first recognition result being generated by detecting the one or more biometric characteristics in the biometric characteristic test components based on the predetermined reference biometric characteristic information; and
  determining a safety test result of the biometric characteristic recognition device based on the first recognition result.

14. The computer-implemented system of claim 13, wherein controlling, based on the camera component and in the target test environment, the mechanical arm to input the one or more biometric characteristics of the predetermined body part of the target user from the biometric characteristic test components to the biometric characteristic recognition device comprises:
  controlling the mechanical arm to place the biometric characteristic test components on the biometric characteristic recognition device based on the camera component;
  obtaining position information of the biometric characteristic test components on the biometric characteristic recognition device based on the camera component;
  detecting whether the biometric characteristic test components are placed on predetermined recognition regions of the biometric characteristics recognition device based on the position information;
  when detecting that the biometric characteristic test components are not placed on the predetermined recognition regions of the biometric characteristics recognition device, controlling the mechanical arm to move the biometric characteristic test components to the predetermined recognition regions of the biometric characteristic recognition device based on the camera component; and
  controlling the mechanical arm to operate the biometric characteristic test components to input the one or more biometric characteristics of the predetermined body part of the target user from the biometric characteristic test components to the biometric characteristic recognition device.

15. A non-transitory, computer-readable medium storing one or more instructions executable by a computer system to perform operations comprising:
  obtaining a target simulated component for testing performance of a biometric characteristic recognition device from a plurality of simulated components having one or more biometric characteristics, wherein the plurality of simulated components are constructed based on the one or more biometric characteristics of a predetermined body part of a target user;
  controlling, based on a camera component arranged on a mechanical arm and in a target test environment having one or more test parameters, the mechanical arm to input biometric characteristic information of the target simulated component to the biometric characteristic recognition device;
  obtaining a recognition result from the biometric characteristic recognition device, the recognition result being generated by detecting the biometric characteristic information of the target simulated component based on predetermined reference biometric characteristic information; and determining a performance test result of the biometric characteristic recognition device based on the recognition result.

16. The non-transitory, computer-readable medium of claim 15, wherein the one or more test parameters comprise at least one of the following: a light parameter in the target test environment, a pressing force parameter of the mechanical arm for the target simulated component, or a pressing angle parameter of the mechanical arm for the target simulated component.

17. The non-transitory, computer-readable medium of claim 15, wherein the one or more biometric characteristics comprise one or more of fingerprint characteristics and palmprint characteristics.

18. The non-transitory, computer-readable medium of claim 17, wherein obtaining the target simulated component for testing the performance of the biometric characteristic recognition device from the plurality of simulated components having the one or more biometric characteristics comprises:
controlling, based on the camera component, the mechanical arm to select the target simulated component from the plurality of simulated components.

19. The non-transitory, computer-readable medium of claim 15, wherein before obtaining the recognition result from the biometric characteristic recognition device, the operations further comprise:
inputting biometric characteristic information of the plurality of simulated components to the biometric characteristic recognition device; and
using the biometric characteristic information of the plurality of simulated components as the predetermined reference biometric characteristic information.

20. The non-transitory, computer-readable medium of claim 19, wherein the operations further comprise:
obtaining biometric characteristic images of the predetermined body part of the target user;
constructing biometric characteristic test components based on the biometric characteristic images, wherein the biometric characteristic test components are configured to input the one or more biometric characteristics of the predetermined body part of the target user to the biometric characteristic recognition device;
controlling, based on the camera component and in the target test environment, the mechanical arm to input the one or more biometric characteristics of the predetermined body part of the target user from the biometric characteristic test components to the biometric characteristic recognition device;
obtaining a first recognition result from the biometric characteristic recognition device, the first recognition result being generated by detecting the one or more biometric characteristics in the biometric characteristic test components based on the predetermined reference biometric characteristic information; and
determining a safety test result of the biometric characteristic recognition device based on the first recognition result.

* * * * *